US011599772B2

(12) United States Patent
Loyola et al.

(10) Patent No.: US 11,599,772 B2
(45) Date of Patent: Mar. 7, 2023

(54) GUIDED CHARACTER STRING ALTERATION

(71) Applicant: INTERNATIONAL BUSINESS MACHINES CORPORATION, Armonk, NY (US)

(72) Inventors: Pablo Loyola, Tokyo (JP); Kugamoorthy Gajananan, Tokyo (JP); Yuji Watanabe, Tokyo (JP); Fumiko Akiyama, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 938 days.

(21) Appl. No.: 16/439,021

(22) Filed: Jun. 12, 2019

(65) Prior Publication Data

US 2020/0394497 A1 Dec. 17, 2020

(51) Int. Cl.
| | | |
|---|---|---|
| *G06N 3/04* | (2006.01) | |
| *H04L 9/40* | (2022.01) | |
| *G06N 3/08* | (2023.01) | |

(52) U.S. Cl.
CPC ............ *G06N 3/0445* (2013.01); *G06N 3/08* (2013.01); *H04L 63/1483* (2013.01)

(58) Field of Classification Search
CPC ...... G06N 3/0445; G06N 3/08; G06N 3/0454; H04L 63/1483
See application file for complete search history.

(56) References Cited

U.S. PATENT DOCUMENTS

| | | | | |
|---|---|---|---|---|
| 8,893,286 | B1 | 11/2014 | Oliver | |
| 10,489,792 | B2* | 11/2019 | Hackman | G06N 3/0454 |
| 2006/0149558 | A1* | 7/2006 | Kahn | G10L 15/063 |
| | | | | 704/278 |
| 2013/0311677 | A1* | 11/2013 | Coulson | H04L 61/4511 |
| | | | | 709/245 |
| 2015/0154720 | A1* | 6/2015 | Matkowsky | G06F 21/10 |
| | | | | 705/310 |

OTHER PUBLICATIONS

Spaulding, Jeffrey, et al. "The landscape of domain name typosquatting: Techniques and countermeasures," 2016 11th International Conference on Availability, Reliability and Security (ARES), Aug. 2016, pp. 284-289.

Szurdi, Janos, et al. "The long "taile" of typosquatting domain names," 23rd {USENIX} Security Symposium ({USENIX} Security 14), 2014, pp. 191-206.

(Continued)

*Primary Examiner* — Khoi V Le
(74) *Attorney, Agent, or Firm* — Tutunjian & Bitetto, P.C.; Randy Emilio Tejeda

(57) ABSTRACT

Guided character string alteration can be performed by obtaining an original character string and a plurality of altered character strings, traversing the original character string with a first Long Short Term Memory (LSTM) network to generate, for each character of the original character string, a hidden state of a partial original character string up to that character, and applying, during the traversing, an alteration learning process to each hidden state of a partial original character string to produce an alteration function for relating partial original character strings to partial altered character strings.

14 Claims, 6 Drawing Sheets

(56) References Cited

OTHER PUBLICATIONS

Szurdi, Janos, et al. "Domain Registration Policy Strategies and the Fight against Online Crime," Weis 2018, Jun. 2018, 16 pages.
Piredda, Paolo, et al. "Deepsquatting: Learning-based typosquatting detection at deeper domain levels," Conference of the Italian Association for Artificial Intelligence, Nov. 2017, pp. 347-358.
Agten, Pieter, et al. "Seven Months' Worth of Mistakes: A Longitudinal Study of Typosquatting Abuse," NDSS, Feb. 2015, pp. 156-168.

* cited by examiner

GUIDED CHARACTER STRING ALTERATION

BACKGROUND

The present invention relates to guided character string alteration. More specifically, the present invention relates to generating altered character strings based on known alterations of character strings.

Cyber-squatting refers to the practice of registering names, especially well-known company or brand names, as Internet domains, in the hope of reselling them at a profit.

Typo-squatting is one form of cyber-squatting where an original domain, such as "facebook.com," is modified to obtain a domain that is similar to the original, but that can be used to fool or misguide a user. For example, a typo-squatted domain, such as "faceboook.com" can be generated to fool a user. In this case, an extra "o", which could resemble a mistake a user can make.

It is a challenge for popular brands to know what active/live domains that look similar to their brand name exist in the vast space of public internet. For any a given brand with online presence, it is critical to make sure there are no cyber-squatted domains in existence, which can steal/drive the internet traffic away from the legitimate domains.

Even worse, some of the cyber-squatted domains can host malicious or questionable content which can harm the brand reputation.

SUMMARY

According to an aspect of the present invention, provided is a computer program product including one or more computer readable storage mediums collectively storing program instructions that are executable by a computer to cause the computer to perform operations including obtaining an original character string and a plurality of altered character strings, traversing the original character string with a first Long Short Term Memory (LSTM) network to generate, for each character of the original character string, a hidden state of a partial original character string up to that character, and applying, during the traversing, an alteration learning process to each hidden state of a partial original character string to produce an alteration function for relating partial original character strings to partial altered character strings.

This aspect can also include the method performed by the processor executing the instructions of the computer program product, and an apparatus that performs the method.

The summary clause does not necessarily describe all necessary features of the embodiments of the present invention. The present invention can also be a sub-combination of the features described above.

BRIEF DESCRIPTION OF THE DRAWINGS

The following description will provide details of preferred embodiments with reference to the following figures wherein.

DETAILED DESCRIPTION

Hereinafter, example embodiments of the present invention will be described. The example embodiments shall not limit the invention according to the claims, and the combinations of the features described in the embodiments are not necessarily essential to the invention.

Embodiments of the present invention can seek to obtain knowledge on how typo-squatted domains are generated. Therefore, it is desirable to obtain a model that produces realistic typo-squatted domains, so they can be used to develop further counter-defenses against these type of attacks.

Generating typo-squatted domains can be thought of as a search problem, however, given the large number of possible combinations of operations over a valid domain, exhaustive searching is not feasible. Therefore, approaches herein can include taking an existing source of collected typo-squatted domains, and learning the distributional patterns of generation.

Models in embodiments of the present invention work by being trained with the original domain as a reference, and a set of known typo-squatted domains. Each original domain can be traversed with an LSTM (Long Short Term Memory) network, during which at each step, both the output and the hidden states are further utilized. The output state can be utilized by a Character Selector, such as a feed forward Neural Network (NN), that is in charge of selecting the next character over a defined vocabulary. The hidden state can be utilized by an Action selector, such as a feed forward NN, that is in charge of selecting the action associated to the character.

The selected action-character pair can be applied to generate a new domain, or at least a partial domain, the full new domain being generated upon completion of the traversal of the original domain. Having these two actions separated can allow better control over the generation by weighting.

At each step, the new domain can be inspected with another LSTM network which produces a vector representation of the generated domain. The model can take into account the set of known typo-squatted domains to produce a loss at training time. In this manner, the model can learn the distributional regularities of real typo-squatted domains. The vector representation of the generated domain can then be utilized at the next step of the LSTM network traversing the original domain as an additional input for the next step. In this manner, generation at the next step is not only aware of the original domain, but also about the domain that it is currently being generated.

At training time, the computed loss takes into account the differences between the current generated domains and each of i) each element from the captured typo-squatted set and ii) a representative element from the captured typo-squatted set. At inference time, given a valid domain, a set of new generated domains that resemble the distribution of real typo squatted domains can be obtained.

Figure 1:
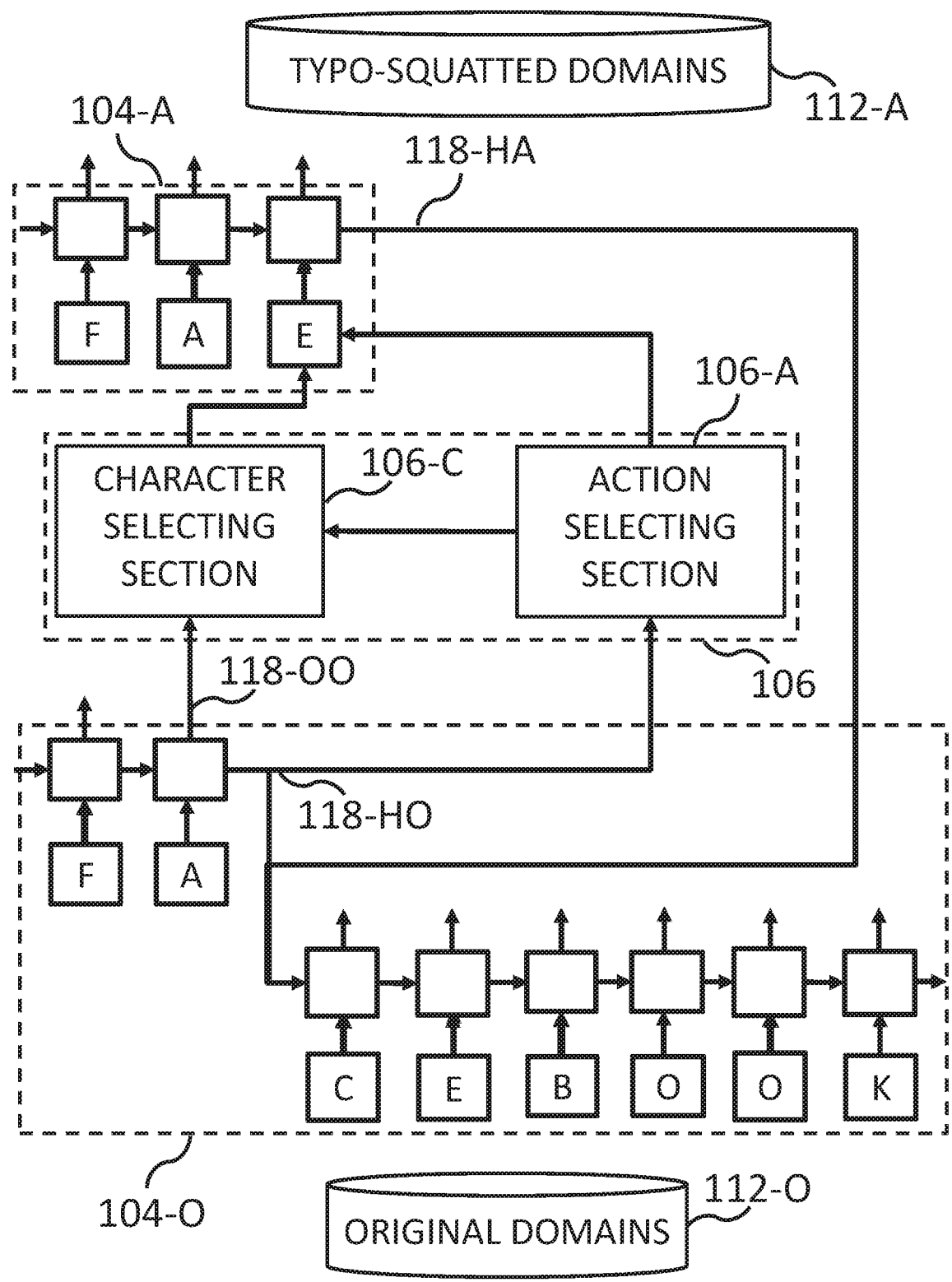
FIG. 1 shows a diagram of the interaction of traversing a character string and applying an alteration learning process, according to an embodiment of the present invention.

FIG. 1 shows a diagram of the interaction of traversing a character string and applying an alteration learning process, according to an embodiment of the present invention. In this embodiment, original domain names 112-O are traversed and applied to an alteration learning process 106 in order to produce an alteration function for relating partial original domain names to partial typo-squatted domain names. For example, an original domain name, "FACEBOOK," is traversed with a first Long Short Term Memory (LSTM) network 104-O to generate, for each character of the original character string, a hidden state of a partial original character string up to that character. In FIG. 1, first LSTM network 104-O is currently generating a hidden state 118-HO for the second character in "FACEBOOK," which is an "A." First LSTM network 104-O is also generating an output state 118-OO. Hidden state 118-HO includes vector information from previous characters in the character string, but output state 118-OO only includes vector information of the current character. Hidden state 118-HO is forwarded to action selecting section 106-A, which is part of an alteration learning process 106. Action selecting section 106-A can select an action to perform based on the hidden state that it receives. In this case, action selecting section 106-A has received hidden state 118-HO, and has selected to add another character. In response, hidden state 118-HO is forwarded to a second LSTM network 104-A, which includes cells for the first two letters, "F" and "A," and another cell for an additional character. Because a new letter is involved, action selecting section 106-A instructs character selecting section 106-C to select a character to use as the additional character. As shown in FIG. 1, character selecting section 106-C has selected "E." Second LSTM network 104-A can traverse the partial altered character string of "FAE" for comparison with partial typo-squatted domain names. In other words, a vector representation of "FAE," which is 3 letters long, is compared with a vector representation of the first 3 letters of each typo-squatted domain name 112-A. Once the comparisons have been made alteration learning process 106 can be updated based on the results of the comparison.

Before generating the hidden state of the next character in "FACEBOOK," second LSTM network 104-A forwards its hidden state 118-HA, the vector representation of "FAE," to the next cell of first LSTM network 104-O. The next cell of LSTM network 104-O will receive both hidden states from the previous cell of first LSTM network 104-O, a vector representation of "FA," and from second LSTM network 104-A, the vector representation of "FAE." In this manner, action selecting section 106-A can base its decision to perform an alteration or not based at least partially on whether or not an alteration has already been made.

Figure 2:
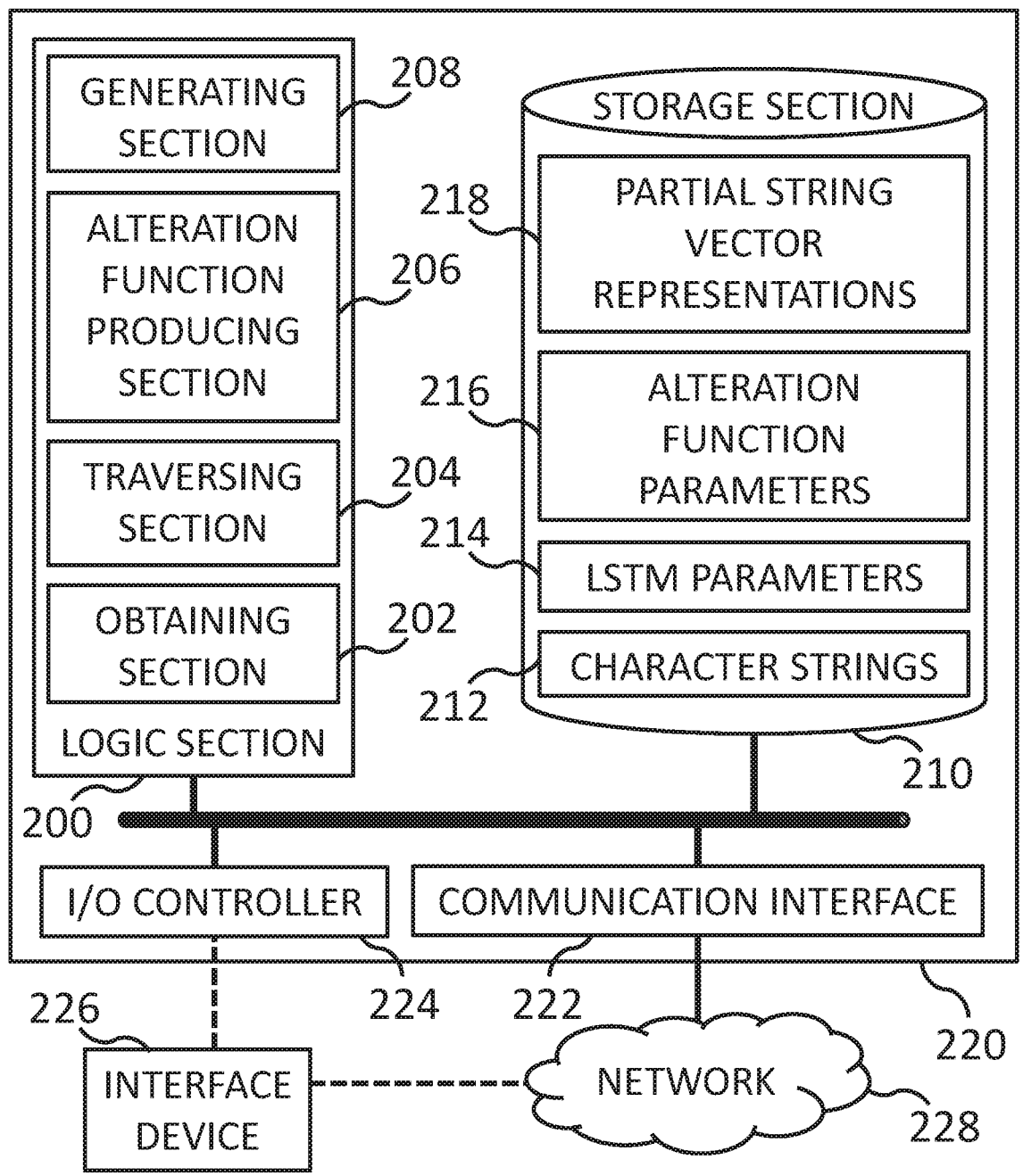
FIG. 2 shows an exemplary hardware configuration for guided character string alteration, according to an embodiment of the present invention.

FIG. 2 shows an exemplary hardware configuration for guided character string alteration, according to an embodiment of the present invention. The exemplary hardware configuration includes apparatus 220, which communicates with network 228, and interacts with an interface device 226, such as a camera. Apparatus 220 can be a host computer such as a server computer or a mainframe computer that executes an on-premise application and hosts client computers that use it, in which case apparatus 220 may not be directly connected to interface device 226, but are connected through a terminal device through network 228. Apparatus 220 can be a computer system that includes two or more computers. Apparatus 220 can be a personal computer that executes an application for a user of apparatus 220.

Apparatus 220 includes a logic section 200, a storage section 210, a communication interface 222, and an input/output (I/O) controller 224. Logic section 200 can be a computer program product including one or more computer readable storage mediums collectively storing program instructions that are executable by a processor or programmable circuitry to cause the processor or programmable circuitry to perform the operations of the various sections. Logic section 200 can alternatively be analog or digital programmable circuitry, or any combination thereof. Logic section 200 can be composed of physically separated storage or circuitry that interacts through communication. Storage section 210 can be a non-volatile computer-readable medium capable of storing non-executable data for access by logic section 200 during performance of the processes herein. Communication interface 222 reads transmission data, which can be stored on a transmission buffering region provided in a recording medium, such as storage section 210, and transmits the read transmission data to network 228 or writes reception data received from network 228 to a reception buffering region provided on the recording medium. I/O controller 224 connects to various input and output units, such as interface device 226, via a parallel port, a serial port, a keyboard port, a mouse port, a monitor port, and the like to accept commands and present information.

Logic section 200 includes obtaining section 202, traversing section 204, alteration function producing section 206, and generating section 208. Storage section 210 includes character strings 212, LSTM parameters 214, alteration function parameters 216, and partial string vector representations 218.

Obtaining section 202 is the portion of logic section 200 that performs obtaining data from storage section 210 and network 228, in the course of guided character string alteration. Obtaining section 202 can include sub-sections for performing additional functions, as described in the flow charts below. Such sub-sections can be referred to by a name associated with their function.

Traversing section 204 is the portion of logic section 200 that traverses original character strings in the course of guided character string alteration. In doing so, traversing section 204 can traverse original character strings from character strings 212 in accordance with LSTM parameters 214 to generate hidden states of partial original character strings, which can be stored in partial string vector representations 218. Traversing section 204 can include sub-sections for performing additional functions, as described in the flow charts below. Such sub-sections can be referred to by a name associated with their function.

Alteration function producing section 206 is the portion of logic section 200 that trains an alteration learning process to produce an alteration function in the course of guided character string alteration. For example, the alteration function can relate partial original character strings to partial altered characters strings. Alteration function producing section 206 can adjust alternation function parameters 216 based on comparisons of partial string vector representations generated by traversing section 204 to partial string vector representations of known alterations of the original character string. Alteration function producing section 206 can include sub-sections for performing additional functions, as described in the flow charts below. Such sub-sections can be referred to by a name associated with their function.

Generating section 208 is the portion of logic section 200 that generates character string alterations from a trained alteration function in the course of guided character string alteration. In doing so, location determining section 208 can utilize the locating function to process a feature vector of unknown location, resulting in an output of a location within the known 3D space. Location determining section 208 can include sub-sections for performing additional functions, as described in the flow charts below. Such sub-sections can be referred to by a name associated with their function.

In other embodiments, the apparatus can be any other device capable of processing logical functions in order to perform the processes herein. The interface device can be any device capable of conveying information to a user from the apparatus, and accepting user input to the apparatus, such as original character strings and known alterations of each original character string to perform guided character string alteration. The apparatus may not need to be connected to a network in environments where the input, output, and all information is directly connected. The logic section and the storage section need not be entirely separate devices, but can share one or more computer-readable mediums. For example, the storage section can be a hard drive storing both the computer-executable instructions and the data accessed by the logic section, and the logic section can be a combination of a central processing unit (CPU) and random access memory (RAM), in which the computer-executable instructions can be copied in whole or in part for execution by the CPU during performance of the processes herein.

In embodiments where the apparatus is a computer, a program that is installed in the computer can cause the computer to function as or perform operations associated with apparatuses of the embodiments of the present invention or one or more sections (including modules, components, elements, etc.) thereof, and/or cause the computer to perform processes of the embodiments of the present invention or steps thereof. Such a program can be executed by a processor to cause the computer to perform certain operations associated with some or all of the blocks of flowcharts and block diagrams described herein.

Figure 3:
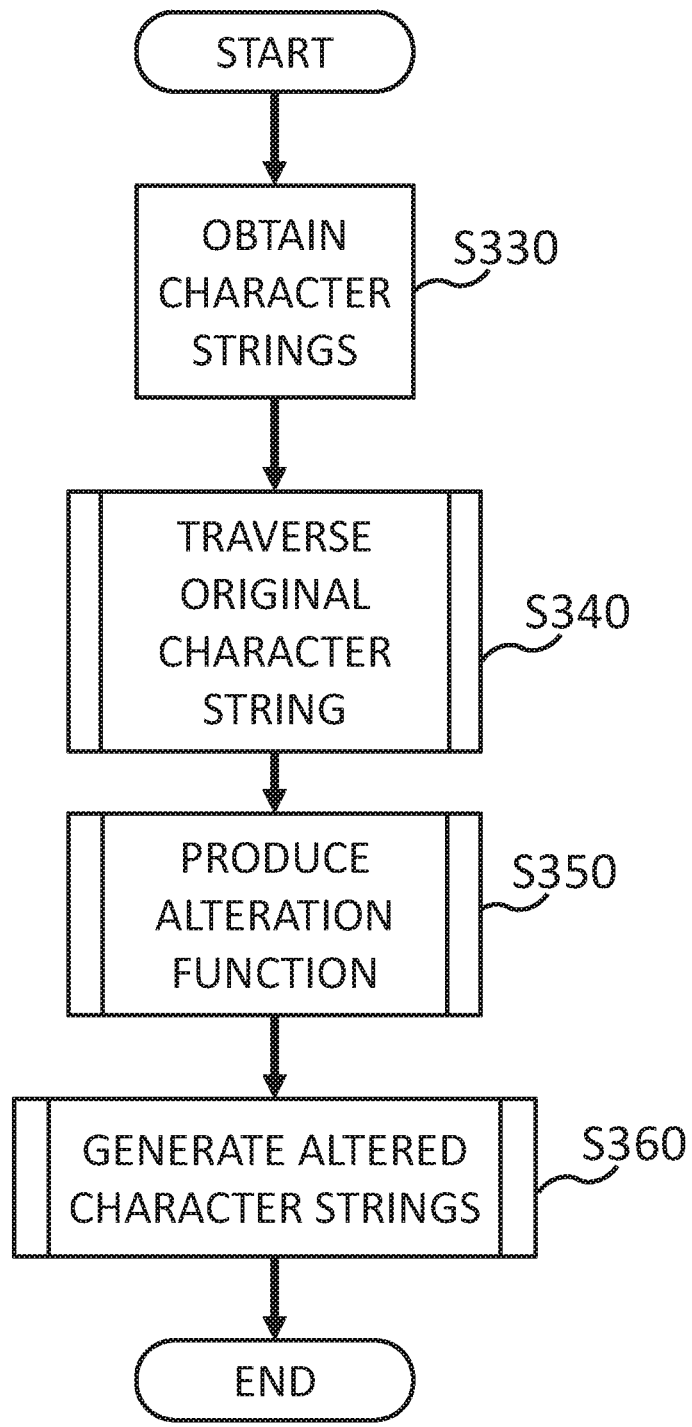
FIG. 3 shows an operational flow for guided character string alteration, according to an embodiment of the present invention.

FIG. 3 shows an operational flow for guided character string alteration, according to an embodiment of the present invention. The operational flow can provide a method of guided character string alteration.

At S330, an obtaining section, such as obtaining section 202, obtains an original character string and a plurality of altered character strings. For example, the obtaining section can obtain an original character string, such as a domain name, and known alterations of that original character string, such as existing typo-squatted domain names. The obtaining section can obtain the character strings directly from user input, such as through interface device 226, or through a network 228 to which interface devices are connected. The obtaining section can store these character strings, such as character strings 212, within storage section 210.

At S340, a traversing section, such as traversing section 204, traverses the original character string to produce an alteration that can be compared to the known alterations of the original character string. The traversing section can utilize one or more LSTM networks in accordance with LSTM parameters 214, within storage section 210. For example, the traversing section can traverse the original character string with a first Long Short Term Memory (LSTM) network to generate, for each character of the original character string, a hidden state of a partial original character string up to that character At S350, an alteration function producing section, such as alteration function producing section 206, produces an alteration function for relating partial original character strings to partial altered character strings. In some embodiments, the alteration function includes a learning process that includes one or more feed forward neural networks operating based on input from an LSTM network traversing the original character string. For example, the alteration learning process can select an action based on each hidden state, and select an alternate character based on each output state corresponding to a hidden state. Both selectors can be parameterized with feed forward neural networks. However, it is also possible to include other types of neural networks or combinations thereof, or types of machine learning, other than neural networks. The alteration function producing section can store the alteration function parameters, which can include parameters for the one or more feed forward neural networks, such as alteration function parameters 216, within storage section 210.

At S360, a generating section, such as generating section 208, generates altered character strings from an original character strings from a trained alteration function. Generating section can generate a new altered character string by applying the alteration function to each hidden state of a partial new character string in accordance with alteration function parameters 216, within storage section 210, once training is complete.

Figure 4:
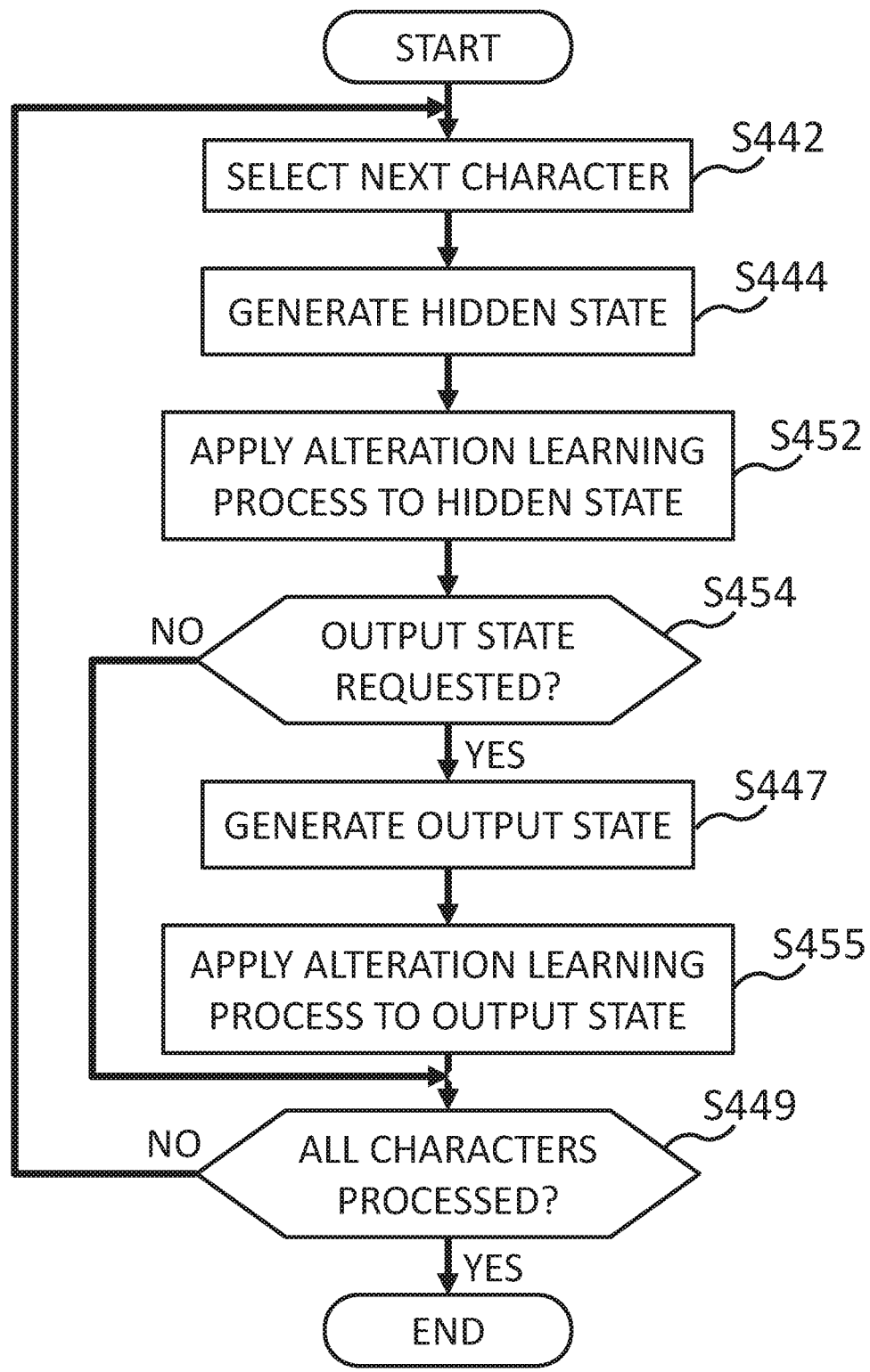
FIG. 4 shows an operational flow for traversing an original character string, according to an embodiment of the present invention.

FIG. 4 shows an operational flow for traversing an original character string, such as in S340 of FIG. 3, according to an embodiment of the present invention. The operations within this operational flow can be performed by a traversing section, such as traversing section 204, or a correspondingly named sub-section thereof. As described in FIG. 3, original character strings and known alterations of that character string can be obtained prior to traversal.

At S442, a character selecting section, such as traversing section 204 or a sub-section thereof, selects the next character in an original character string. If this is the first iteration of traversal of the original character string, then the first character is selected.

At S444, a hidden state generating section, such as traversing section 204 or a sub-section thereof, generates a hidden state of a partial original character string up to the selected character. Traversing section 204 can utilize an LSTM network in accordance with LSTM parameters 214 to generate the hidden state. To generate a hidden state of a partial original character string up to the selected character, the hidden state generating section can consider both the previous hidden state of the partial original character string and the vector representation of the partial altered character representation, if it exists. As iterations of the traversal of the original character string proceed, the traversing includes considering, for each character of the original character string, the vector representation of the partial altered character string output in response to application of the alteration learning process to the previous character of the original character string, to generate the hidden state. The hidden state generating section can be able to do this by utilizing an LSTM network having an input layer large enough to handle both, and during iterations where no partial altered character string has been produced the relevant nodes of the input layer are simply filled with zeros.

At S452, an alteration learning process application section, such as traversing section 204 or a sub-section thereof, applies an alteration learning process to the hidden state of the partial original character string. The alteration learning process can be applied mainly for other purposes, but the traversing process herein will proceed differently depending on the result of the application of the alteration learning process.

At S454, a traversing section, such as traversing section 204, considers whether the alteration learning process is requesting an output state of the selected character. The conditions determining whether the alteration learning process requests an output state of the selected character will be described below in FIG. 5. If the alteration learning process requests an output state of the selected character, then the operation proceeds to S447. If the alteration learning process does not request an output state of the selected character, then the operation proceeds to S449.

At S447, an output state generating section, such as traversing section 204 or a sub-section thereof, generates an output state of the selected character. Unlike generation of the hidden state, the output state generating section only considers the selected character of the original character string. As iterations of the traversal of the original character string proceed, the traversing further generates, for each character in the original character string, an output state of that character.

At S455, the alteration learning process application section applies an alteration learning process to the output state of the selected original character string. The alteration learning process can be applied mainly for other purposes, but future iterations of the traversing process can proceed differently depending on the result of the application of the alteration learning process.

At S449, the traversing section determines whether all of the characters have been processed by the traversing section. If any characters remain unprocessed, then the operational flow returns to S442, where the next character is selected for processing. If no characters remain unprocessed, then the operational flow ends.

Figure 5:
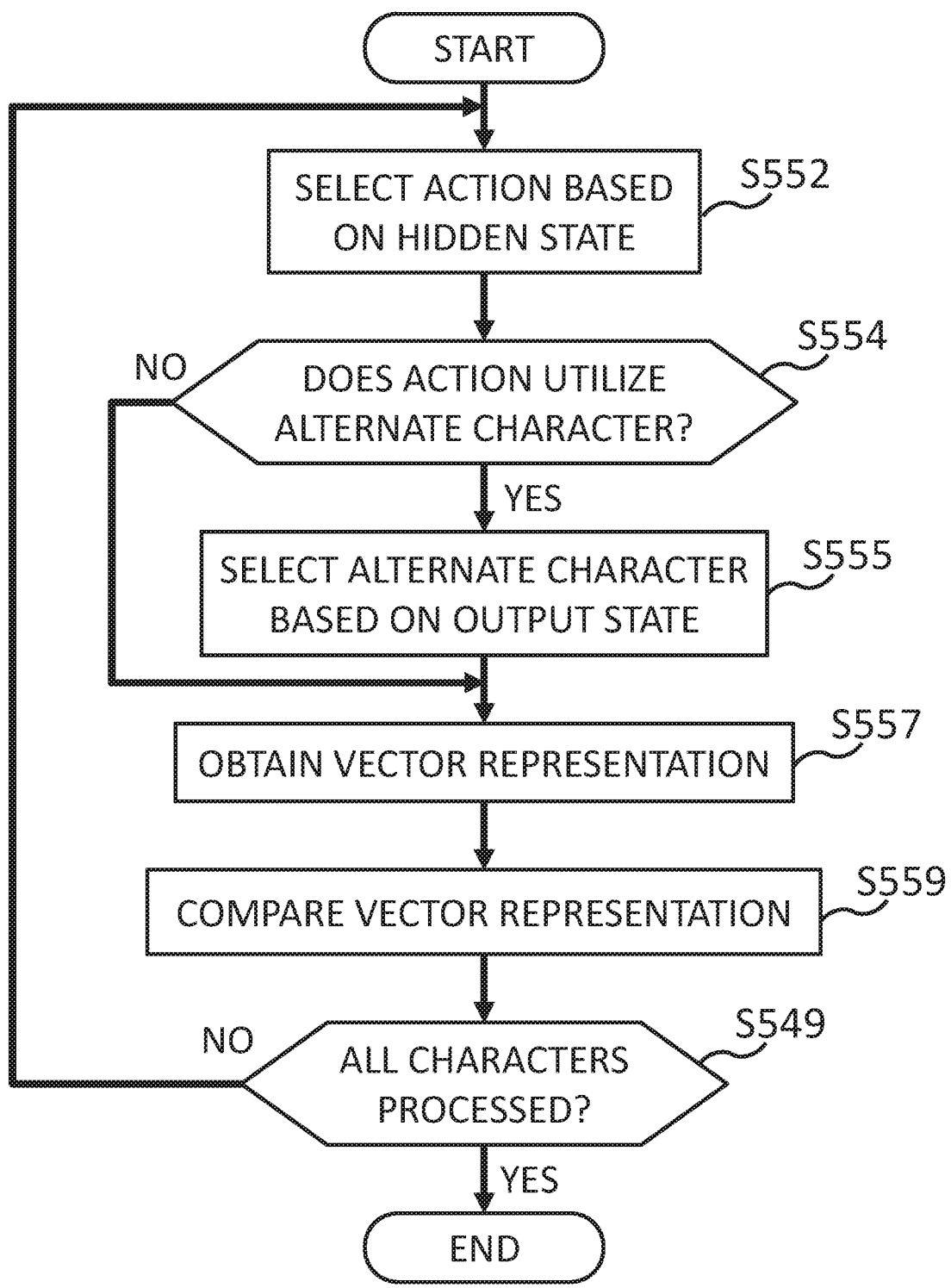
FIG. 5 shows an operational flow for producing an alteration function, according to an embodiment of the present invention.

FIG. 5 shows an operational flow for producing an alteration function, such as S350 of FIG. 3, according to an embodiment of the present invention. The operations within this operational flow can be performed by an alteration function producing section, such as alteration function producing section 206, or a correspondingly named sub-section thereof.

At S552, an action selecting section, such as alteration function producing section 206 or a sub-section thereof, selects an action based on the hidden state generated by the traversing section. The action selecting section can be a feed forward neural network. In some embodiments, the actions that can be selected by the action selecting section include adding the alternate character to the original character, replacing the original character with the alternate character, permuting the original character with the previous character in the original character string, removing the original character, and maintaining the original character. Different actions are possible in other embodiments, including different combinations of the foregoing actions, and/or new actions.

At S554, the alteration function producing section determines whether the action utilizes an alternate character. There can be an implicit hierarchy between the action selector and the char selector, such that the character selector is turned off if the selected action does not require a character. For example, if the action selected by the action selecting section is adding or replacing the original character with an alternate character, then the selected action utilizes an alternate character. In contrast, if the action selected by the action selecting section is maintaining or removing the original character or permuting the original character with the previous character in the original character string, then the selected action does not utilize an alternate character. If the selected action utilizes an alternate character, then the operational flow proceeds to S55. If the selected action does not utilize an alternate character, then the operational flow proceeds to S557.

At S555, an alternate character selecting section, such as alteration function producing section 206 or a sub-section thereof, selects an alternate character based on an output state of the selected character. The alternate character selecting section can be a learning process, such as a feed forward neural network that is separate from the action selecting section feed forward neural network, yet part of the alteration learning process. As iterations of the alteration function producing section proceed, the alternate character learning process is applied to an output state corresponding to the one or more hidden states to produce an alternate character generating function for relating an original character to an alternate character.

At S557, a vector representation obtaining section, such as alteration function producing section or a sub-section thereof, obtains a vector representation of a partial altered character string. The vector representation obtaining section can obtain the vector representation from a second LSTM network, such as LSTM network 104A. Obtaining the vector representation of each partial altered character string can include applying each partial altered character string to a second LSTM network. A partial altered character string can result from the selected action at S552. As iterations of the alteration function producing section proceed, the applying the alteration learning process includes obtaining a vector representation of each partial altered character string output from the alteration learning process.

At S559, a vector representation comparing section, such as alteration function producing section or a sub-section thereof, compares the vector representation of the partial altered character string with partial known alterations of the character string. The comparison is made with partial known alterations of the same length. For example, a partial altered character string of 3 characters is compared with the first 3 characters of known alterations of the character string. Once the comparisons are made, parameters of the alteration learning process can be adjusted based on whether the partial altered character string matches any of the known alterations of the character string. Parameters of the alternate character learning process can be adjusted as well during iterations in which the selected action utilizes an alternate character. In other words, a loss from the alteration learning process are applied to the alternate character learning process only in response to selection of an action utilizing the selected alternate character. The action and content are separated, yielding the ability to tune the generation by re-weighting their importance. For example, the model can come to believe that the "add" action is more desirable than the "permute" action. Parameters of the first LSTM network and the second LSTM network can be updated as well to produce better hidden and output vectors that improve the alteration learning process. In such embodiments the learning in the LSTM networks is auxiliary and oriented to learn representations of the data.

At S549, the alteration function producing section determines whether all of the characters have been processed by the alteration function producing section. If any characters remain unprocessed, then the operational flow returns to S552, where an action for the next character is selected. If no characters remain unprocessed, then the operational flow ends.

If the selected action at S552 and this and all previous iterations for an original character string is to maintain the original character, then a partial altered character string may not yet exist. In such cases, S557 and S559 can be skipped.

Figure 6:
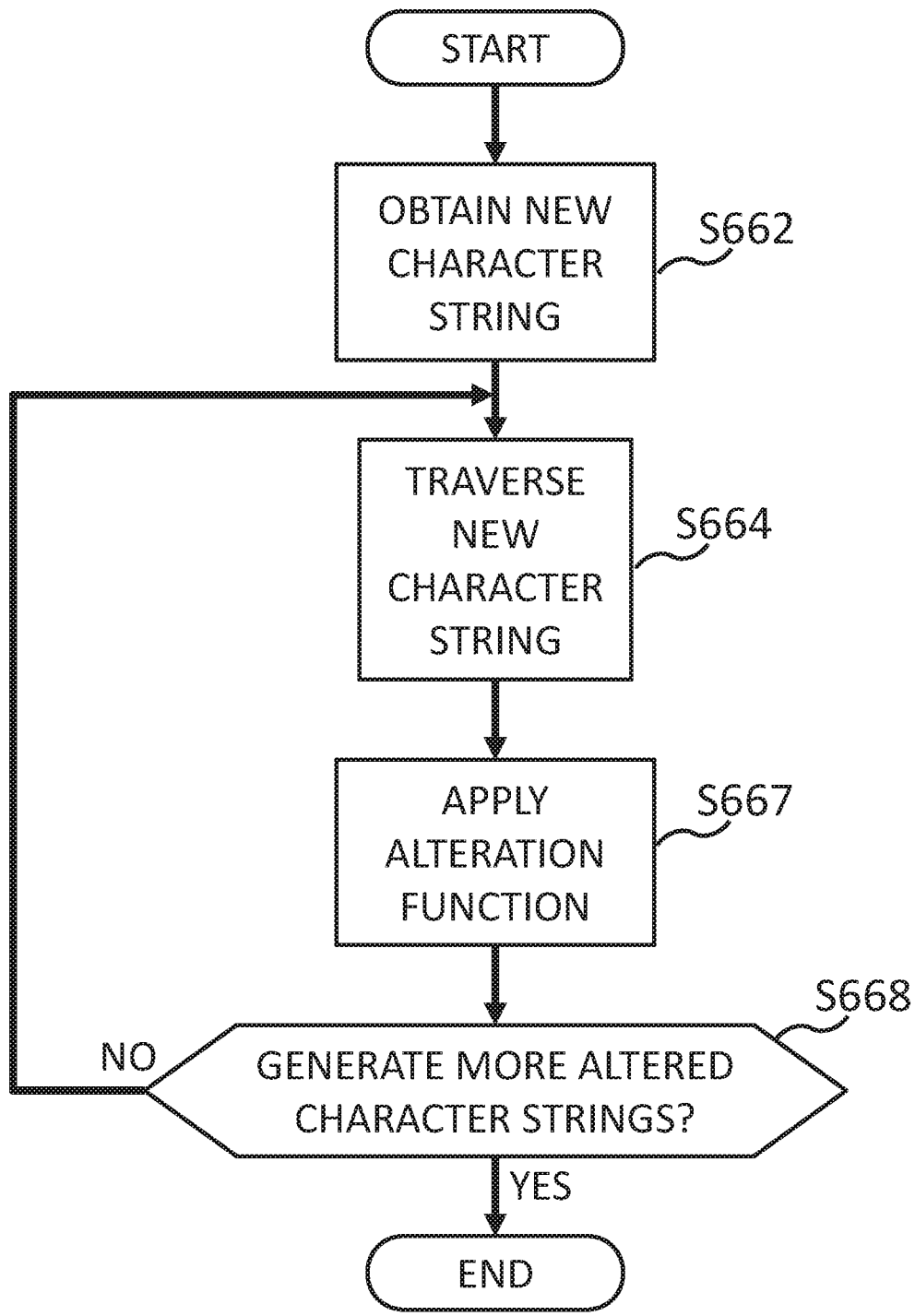
FIG. 6 shows an operational flow for generating altered character strings, according to an embodiment of the present invention.

FIG. 6 shows an operational flow for generating altered character strings, such as S360 of FIG. 3, according to an embodiment of the present invention. The operations within this operational flow can be performed by a generating section, such as generating section 208, or a correspondingly named sub-section thereof.

At S662, an obtaining section, such as obtaining section 202, obtains a new character string. Because this operational flow is for generating altered character strings from a trained alteration function, it may not be necessary to obtain known alterations of the new character string, unlike S330.

At S664, a traversing section, such as traversing section 204, traverses the new character string. For example, the traversing section can traverse the new character string with the first LSTM network, such as LSTM network 104O, to generate, for each character of the new character string, a hidden state of a partial new character string up to that character.

At S667, an alteration function applying section, such as generating section 208 or a sub-section thereof, applies the alteration function to each hidden state of a partial new character string. Unlike S350 of FIG. 3, the generating section can apply a fully trained alteration function. Applying the alteration function to each hidden state generates a new altered character string.

At S668, the generating section determines whether more altered character strings are desired. For example, a requisite number of altered character strings can be desired. Alternatively, altered character strings will continue to be desired until a desire amount are found to match existing character strings. If more altered character strings are desired, then the operational flow returns to S662, where the new character string is once again traversed. If no further altered character strings are desired, then the operational flow ends.

When compared with traditional methods of generating altered character strings, such as when using predetermined rules for altering character strings, or using SEQ2SEQ architecture, embodiments of the present invention can more effectively generate altered character strings that actually exist. In testing, some embodiments of the present invention have shown a higher success rate compared with traditional object localization techniques, and also show improved ability to generate altered character strings that are less similar to the original character string, yet actually exist.

Various embodiments of the present invention can be described with reference to flowcharts and block diagrams whose blocks can represent (1) processes in which operations are performed or (2) sections of apparatuses responsible for performing operations. Certain steps and sections can be implemented by dedicated circuitry, programmable circuitry supplied with computer-readable instructions stored on computer-readable media, and/or processors supplied with computer-readable instructions stored on computer-readable media. Dedicated circuitry can include digital and/or analog hardware circuits and can include integrated circuits (IC) and/or discrete circuits. Programmable circuitry can include reconfigurable hardware circuits including logical AND, OR, XOR, NAND, NOR, and other logical operations, flip-flops, registers, memory elements, etc., such as field-programmable gate arrays (FPGA), programmable logic arrays (PLA), etc.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the embodiments of the present invention include artificial intelligence, and neural networks in particular. Some of the foregoing embodiments describe specific types of neural networks. However, a neural network usually starts as a configuration of random values. Such untrained neural networks must be trained before they can be reasonably expected to perform a function with success. Many of the processes described herein are for the purpose of training neural networks for guided character string alteration. Once trained, a neural network can be used for guided character string alteration, and can not require further training. In this way, a trained neural network is a product of the process of training an untrained neural network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer program product including one or more non-transitory computer readable storage mediums collectively storing program instructions that are executable by a computer to cause the computer to perform operations comprising:
    obtaining an original character string and a plurality of altered character strings;
    traversing the original character string with a first Long Short Term Memory (LSTM) network to generate, for each character of the original character string, a hidden state of a partial original character string up to that character; and
    applying, during the traversing, an alteration learning process to each hidden state of a partial original character string to produce an alteration function for relating partial original character strings to partial altered character strings, thereby developing counter-defenses against attacks,
    wherein the traversing of the original character string further generating, for each character in the original character string, an output state of that character, and the applying of the alteration learning process further selecting an action based on each hidden state, and selecting an alternate character based on each output state corresponding to a hidden state,
    wherein the action is one of adding the alternate character to the original character, replacing the original character with the alternate character, permuting the original character with the previous character in the original character string, removing the original character, and maintaining the original character.

2. The computer program product of claim 1, further comprising
    obtaining a new character string;
    traversing the new character string with the first LSTM network to generate, for each character of the new character string, a hidden state of a partial new character string up to that character; and
    generating a new altered character string by applying the alteration function to each hidden state of a partial new character string.

3. The computer program product of claim 1, wherein the alteration learning process includes an alternate character learning process that is applied to an output state corresponding to the one or more hidden states to produce an alternate character generating function for relating an original character to an alternate character.

4. The computer program product of claim 1, wherein a loss from the alteration learning process is applied to the alternate character learning process only in response to selection of an action utilizing the selected alternate character.

5. The computer program product of claim 1, wherein
the applying the alteration learning process includes obtaining a vector representation of each partial altered character string output from the alteration learning process, and
the traversing includes considering, for each character of the original character string, the vector representation of the partial altered character string output in response to application of the alteration learning process to the previous character of the original character string, to generate the hidden state.

6. The computer program product of claim 5, wherein obtaining the vector representation of each partial altered character string includes applying each partial altered character string to a second LSTM network.

7. A computer-implemented method comprising:
obtaining an original character string and a plurality of altered character strings;
traversing the original character string with a first Long Short Term Memory (LSTM) network to generate, for at each character of the original character string, a hidden state of a partial original character string up to that character; and
applying, during the traversing, an alteration learning process to each hidden state to produce an alteration function for relating partial original character strings to partial altered character strings, thereby developing counter-defenses against attacks,
wherein the traversing of the original character string further generating, for each character in the original character string, an output state of that character, and the applying of the alteration learning process further selecting an action based on each hidden state, and selecting an alternate character based on each output state corresponding to a hidden state,
wherein the action is one of adding the alternate character to the original character, replacing the original character with the alternate character, permuting the original character with the previous character in the original character string, removing the original character, and maintaining the original character.

8. The computer-implemented method of claim 7, further comprising
obtaining a new character string;
traversing the new character string with the first LSTM network to generate, for each character of the new character string, a hidden state of a partial new character string up to that character; and
generating a new altered character string by applying the alteration function to each hidden state of a partial new character string.

9. The computer-implemented method of claim 7, wherein the alteration learning process includes an alternate character learning process that is applied to an output state corresponding to the one or more hidden states to produce an alternate character generating function for relating an original character to an alternate character.

10. The computer-implemented method of claim 7, wherein a loss from the alteration learning process is applied to the alternate character learning process only in response to selection of an action utilizing the selected alternate character.

11. An apparatus comprising:
a memory device for storing program code; and
a processor device operatively coupled to the memory device for running the program code to:
obtain an original character string and a plurality of altered character strings;
traverse the original character string with a first Long Short Term Memory (LSTM) network to generate, for at each character of the original character string, a hidden state of a partial original character string up to that character; and
apply, during traversing, an alteration learning process to each hidden state to produce an alteration function for relating partial original character strings to partial altered character strings, thereby developing counter-defenses against attacks,
wherein the traversing of the original character string further generating, for each character in the original character string, an output state of that character, and the applying of the alteration learning process further selecting an action based on each hidden state, and selecting an alternate character based on each output state corresponding to a hidden state,
wherein the action is one of adding the alternate character to the original character, replacing the original character with the alternate character, permuting the original character with the previous character in the original character string, removing the original character, and maintaining the original character.

12. The apparatus of claim 11, wherein the processor is further configured to:
generate a new altered character string by applying the alteration function to each hidden state of a partial new character string,
obtain a new character string, and
traverse the new character string with the first LSTM network to generate, for each character of the new character string, a hidden state of a partial new character string up to that character.

13. The apparatus of claim 11, wherein the alteration learning process includes an alternate character learning process that is applied to an output state corresponding to the one or more hidden states to produce an alternate character generating function for relating an original character to an alternate character.

14. The computer program product of claim 11, wherein a loss from the alteration learning process is applied to the alternate character learning process only in response to selection of an action utilizing the selected alternate character.

* * * * *